United States Patent
Hahn

(10) Patent No.: US 12,192,005 B2
(45) Date of Patent: Jan. 7, 2025

(54) METHOD AND APPARATUS FOR TRANSMITTING AND RECEIVING HARQ RESPONSE IN COMMUNICATION SYSTEM

(71) Applicants: Hyundai Motor Company, Seoul (KR); Kia Corporation, Seoul (KR)

(72) Inventor: Gene Back Hahn, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 330 days.

(21) Appl. No.: 17/772,432

(22) PCT Filed: Oct. 23, 2020

(86) PCT No.: PCT/KR2020/014549
§ 371 (c)(1),
(2) Date: Apr. 27, 2022

(87) PCT Pub. No.: WO2021/085944
PCT Pub. Date: May 6, 2021

(65) Prior Publication Data
US 2022/0376834 A1 Nov. 24, 2022

Related U.S. Application Data

(60) Provisional application No. 62/928,767, filed on Oct. 31, 2019.

(30) Foreign Application Priority Data

Oct. 22, 2020 (KR) .................. 10-2020-0137774

(51) Int. Cl.
*H04L 1/1812* (2023.01)
*H04L 1/1829* (2023.01)
(Continued)

(52) U.S. Cl.
CPC .......... *H04L 1/1812* (2013.01); *H04L 1/1861* (2013.01); *H04L 1/1893* (2013.01); *H04W 92/18* (2013.01)

(58) Field of Classification Search
CPC ... H04L 1/1812; H04L 1/1861; H04L 1/1893; H04L 1/1854; H04L 5/0055;
(Continued)

(56) References Cited

U.S. PATENT DOCUMENTS

2021/0105842 A1* 4/2021 Cheng .................. H04L 5/0055

FOREIGN PATENT DOCUMENTS

WO 2019-151915 A1 8/2019

OTHER PUBLICATIONS

Nokia, Discussion on Sidclink groupcast HARQ, R1-1902916, 3GPP TSG-RANWGI Meeting #96, Athens, Greece, Feb. 16, 2019.
(Continued)

*Primary Examiner* — Dinh Nguyen
(74) *Attorney, Agent, or Firm* — Fox Rothschild LLP

(57) ABSTRACT

Disclosed are a method and apparatus for transmitting and receiving an HARQ response in a communication system. An operation method of a first terminal comprises the steps of: configuring a first HARQ identifier mapped to a first HARQ feedback resource; transmitting, to a second terminal, a message including the first HARQ identifier; transmitting sidelink data to a plurality of terminals belonging to a groupcast group in a groupcast method; and receiving, from the second terminal, an HARQ response to the sidelink data in the first HARQ feedback resource mapped to the first HARQ identifier.

17 Claims, 7 Drawing Sheets

(51) Int. Cl.
*H04L 1/1867* (2023.01)
*H04W 92/18* (2009.01)

(58) Field of Classification Search
CPC ....... H04L 1/1896; H04L 1/16; H04L 5/0053;
H04W 92/18; H04W 4/40
See application file for complete search history.

(56) References Cited

OTHER PUBLICATIONS

Huawei, Identifier assignment to enable Option2 groupcast HARQ feedback, R2-1913705, 3GPP TSG-RAN WG2 Meeting #107 bis, Chongqing, China, Oct. 4, 2019.
Intel Corp., Summary#3 for AI 7.2.4.2.2 Mode-2 Resource Allocation, R1-1907888, 3GPP TSG RAN WG1 Meeting #97, Reno, USA, May 17, 2019.
Zte, Discussion on Phy Procedures for Sidelink, R1-1910299, 3GPP TSG RAN WG1 Meeting #98bis. Chongqing, China, Oct. 6, 2019.

* cited by examiner

METHOD AND APPARATUS FOR TRANSMITTING AND RECEIVING HARQ RESPONSE IN COMMUNICATION SYSTEM

CROSS-REFERENCE TO RELATED APPLICATIONS

This application is a National Phase application filed under 35 USC 371 of PCT International Application No. PCT/KR2020/014549 with an International Filing Date of Oct. 23, 2020, which claims priority from U.S. Provisional Application 62/928,767 filed on Oct. 31, 2019 and Korean Application 10-2020-0137774 filed on Oct. 22, 2020. The entire contents of these applications are incorporated herein by reference in their entirety.

1. Field

The present disclosure relates to a sidelink communication technique, and more particularly, to a technique for transmitting and receiving a hybrid automatic repeat request (HARQ) response for groupcast communication.

2. Background

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, sidelink communication may be performed in a broadcast scheme, a multicast scheme, a groupcast scheme, or a unicast scheme. When sidelink data is transmitted in the groupcast scheme, each of a plurality of terminals participating in the sidelink communication may transmit a hybrid automatic repeat request (HARQ) response for the sidelink data. In this case, methods for allocating HARQ feedback resources to the plurality of terminals are needed.

SUMMARY

In one aspect, a method and an apparatus are provided for configuring HARQ feedback resources for groupcast communication.

In one aspect, a method of a first user equipment (UE) may comprise: configuring a first hybrid automatic repeat request (HARQ) identifier mapped to a first HARQ feedback resource; transmitting a message including the first HARQ identifier to a second UE; transmitting sidelink data to a plurality of UEs belonging to a groupcast group in a groupcast scheme; and receiving a HARQ response for the sidelink data from the second UE in the first HARQ feedback resource mapped to the first HARQ identifier, wherein the second UE belongs to the groupcast group.

A plurality of HARQ feedback resources for the groupcast group may be configured to the plurality of UEs, and the first HARQ feedback resource mapped to the first HARQ identifier may belong to the plurality of HARQ feedback resources.

The plurality of HARQ feedback resources may be independently configured for the plurality of UEs belonging to the groupcast group.

The method may further comprise: transmitting, to a base station, a message including one or more of a UE identifier of the first UE, a header indicator indicating that the first UE operates as a header UE of the groupcast group, or a group identifier indicating the groupcast group controlled by the first UE; and receiving, from the base station, a message including information elements indicating a plurality of HARQ feedback resources for the groupcast group, wherein the first HARQ feedback resource mapped to the first HARQ identifier may belong to the plurality of HARQ feedback resources.

The message may be a radio resource control (RRC) message, a medium access control (MAC) message, or a physical (PHY) message.

The first HARQ feedback resource may be a code sequence configured by a code division multiplexing (CDM) scheme, a frequency resource configured by a frequency division multiplexing (FDM) scheme, or a time resource configured by a time division multiplexing (TDM) scheme.

The method may further comprise: configuring a second HARQ identifier mapped to a second HARQ feedback resource when a new UE is added to the groupcast group; and transmitting a message including the second HARQ identifier to the new UE.

The method may further comprise: reconfiguring HARQ identifiers allocated to remaining UEs excluding the second UE among the plurality of UEs when the second UE leaves the groupcast group; and transmitting the reconfigured HARQ identifiers to the remaining UEs.

A method of a second user equipment (UE), according to a second exemplary embodiment, may comprise: receiving, from a first UE, a message including a first hybrid automatic repeat request (HARQ) identifier mapped to a first HARQ feedback resource; receiving sidelink data from the first UE; generating a HARQ response for the sidelink data; and transmitting the HARQ response to the first UE in the first HARQ feedback resource mapped to the first HARQ identifier, wherein the sidelink data is transmitted by the first UE in a groupcast scheme.

The method may further comprise receiving, from a base station, a message including information elements indicating a plurality of HARQ feedback resources for a groupcast group to which the second UE belongs, wherein the first HARQ feedback resource may belong to the plurality of HARQ feedback resources.

The message may further include an information element indicating the first HARQ feedback resource.

The message may be a radio resource control (RRC) message, a medium access control (MAC) message, or a PHY (physical) message.

The first HARQ feedback resource may be a code sequence configured by a code division multiplexing (CDM) scheme, a frequency resource configured by a frequency division multiplexing (FDM) scheme, or a time resource configured by a time division multiplexing (TDM) scheme.

The method may further comprise, when the third UE leaves the groupcast group, receiving a message including a reconfigured HARQ identifier from the first UE, wherein in a HARQ feedback procedure, the reconfigured HARQ identifier may be used instead of the first HARQ identifier.

A first user equipment (UE), according to a third exemplary embodiment, may comprise: a processor; and a memory storing at least one instruction executable by the processor, wherein the at least one instruction causes the first UE to: configure a first hybrid automatic repeat request (HARQ) identifier mapped to a first HARQ feedback resource; transmit a message including the first HARQ identifier to a second UE; transmit sidelink data to a plurality of UEs belonging to a groupcast group in a groupcast scheme; and receive a HARQ response for the sidelink data from the second UE in the first HARQ feedback resource mapped to the first HARQ identifier, wherein the second UE may belong to the groupcast group.

The plurality of HARQ feedback resources for the groupcast group may be configured to the plurality of UEs, the first HARQ feedback resource mapped to the first HARQ identifier may belong to the plurality of HARQ feedback resources, and the plurality of HARQ feedback resources may be independently configured for the plurality of UEs belonging to the groupcast group.

The at least one instruction may further cause the first UE to: transmit, to a base station, a message including one or more of a UE identifier of the first UE, a header indicator indicating that the first UE operates as a header UE of the groupcast group, or a group identifier indicating the groupcast group controlled by the first UE; and receive, from the base station, a message including information elements indicating a plurality of HARQ feedback resources for the groupcast group, wherein the first HARQ feedback resource mapped to the first HARQ identifier may belong to the plurality of HARQ feedback resources.

The first HARQ feedback resource may be a code sequence configured by a code division multiplexing (CDM) scheme, a frequency resource configured by a frequency division multiplexing (FDM) scheme, or a time resource configured by a time division multiplexing (TDM) scheme.

The at least one instruction may further cause the first UE to: configure a second HARQ identifier mapped to a second HARQ feedback resource when a new UE is added to the groupcast group; and transmit a message including the second HARQ identifier to the new UE.

The at least one instruction may further cause the first UE to: reconfigure HARQ identifiers allocated to remaining UEs excluding the second UE among the plurality of UEs when the second UE leaves the groupcast group; and transmit the reconfigured HARQ identifiers to the remaining UEs.

One or more the above steps may be carried out through use of a processor or control unit.

According to the present disclosure, in groupcast-sidelink communication, a HARQ feedback resource may be independently configured for each of terminals. Here, a HARQ identifier used for identifying the HARQ feedback resource may be configured, and the HARQ identifier mapped to the HARQ feedback resource may be transmitted to a terminal. The terminal may transmit a HARQ response by using the HARQ feedback resource indicated by the HARQ identifier. Therefore, a HARQ response transmission/reception procedure can be efficiently performed, and the performance of the communication system can be improved.

Other aspects are disclosed infra

DETAILED DESCRIPTION

DETAILED DESCRIPTION

Figure 1:
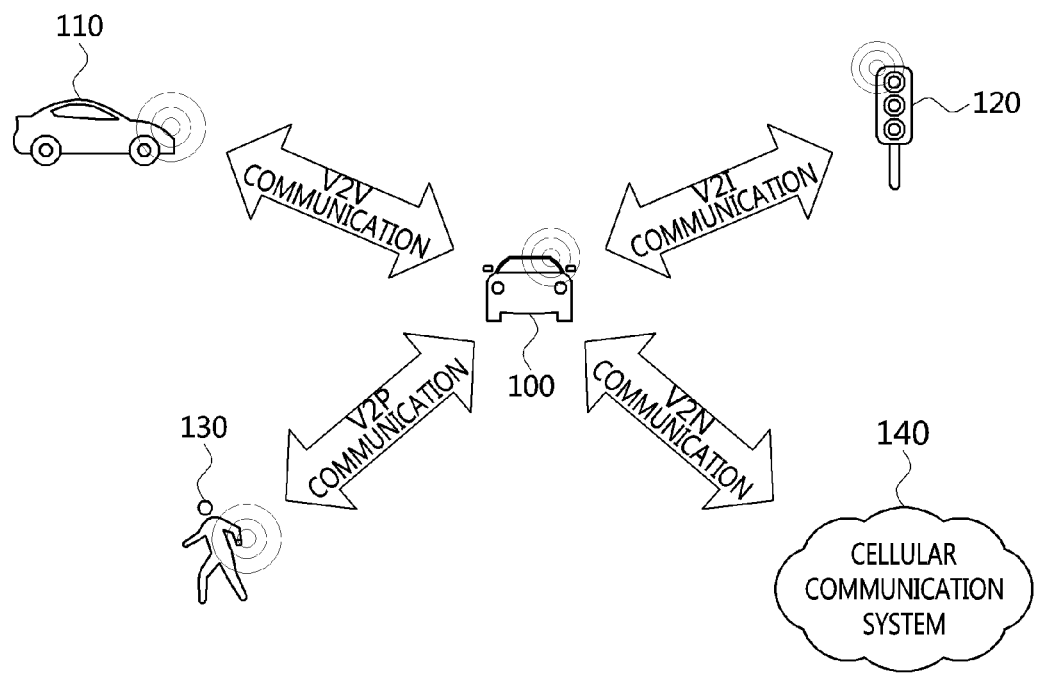
FIG. 1 is a conceptual diagram illustrating V2X communication scenarios.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present invention will be described in detail with reference to the accompanying drawings. In describing the present invention, to facilitate the entire understanding, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
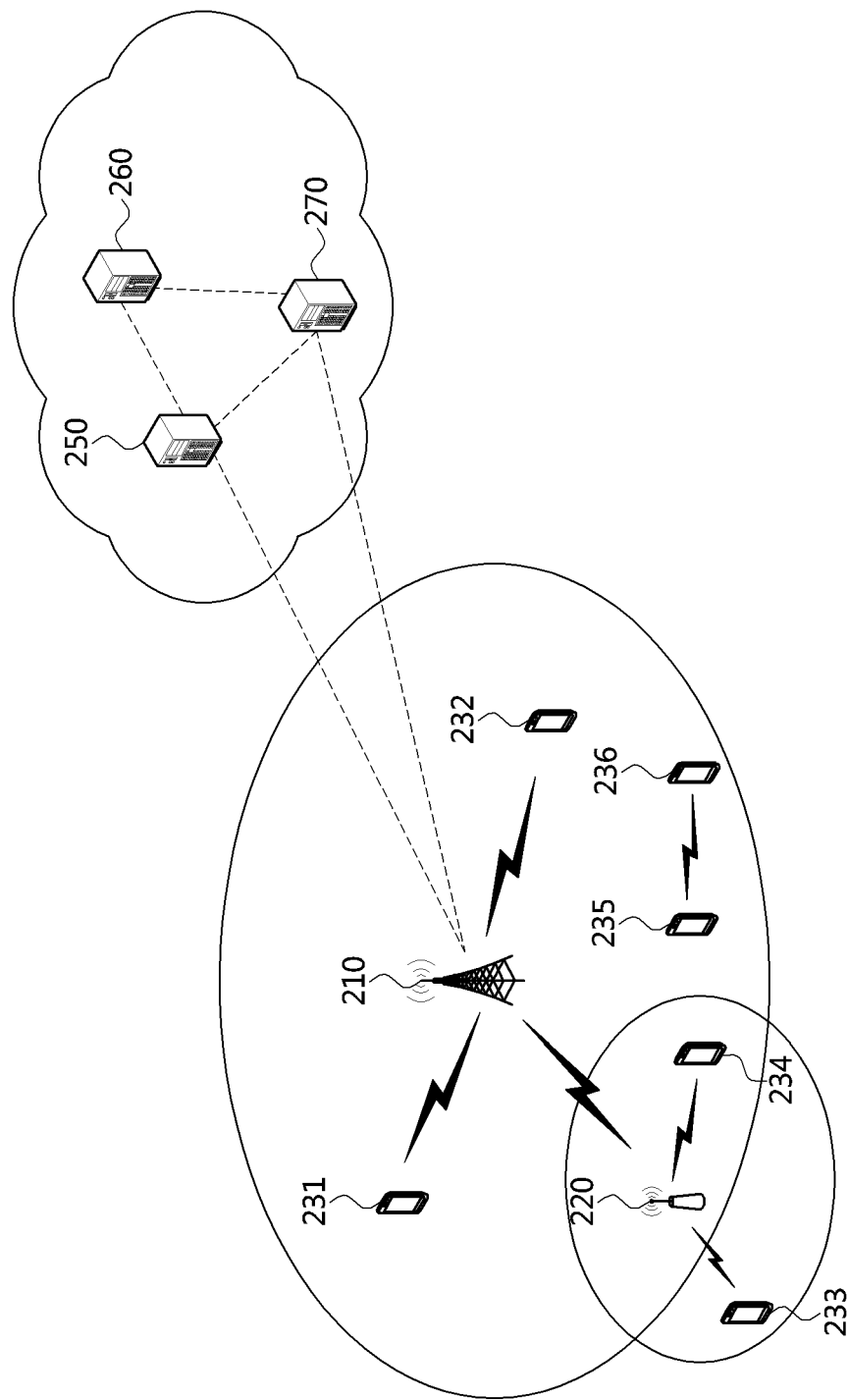
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
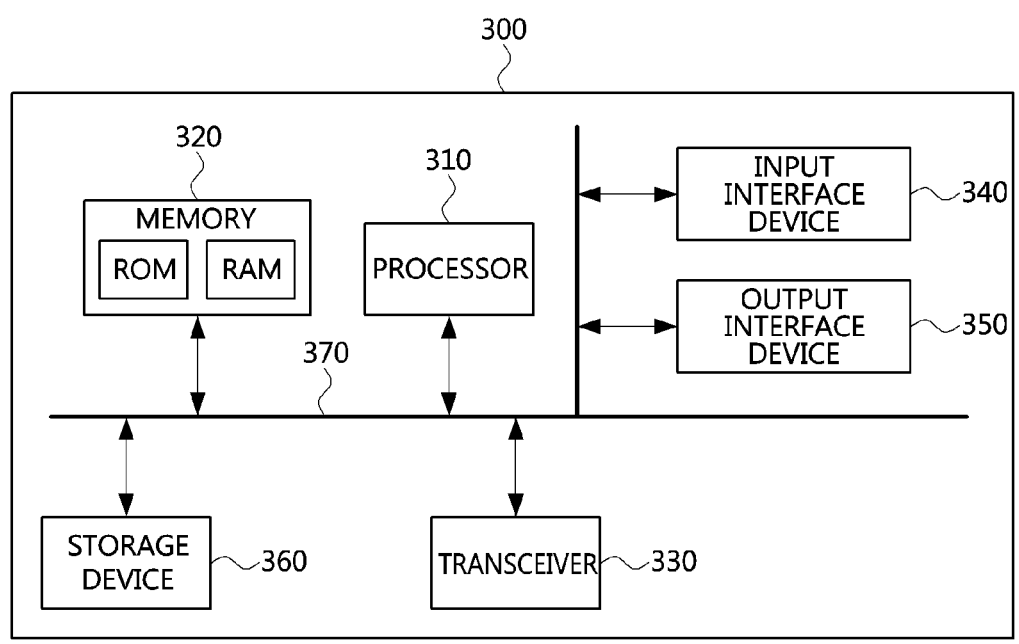
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
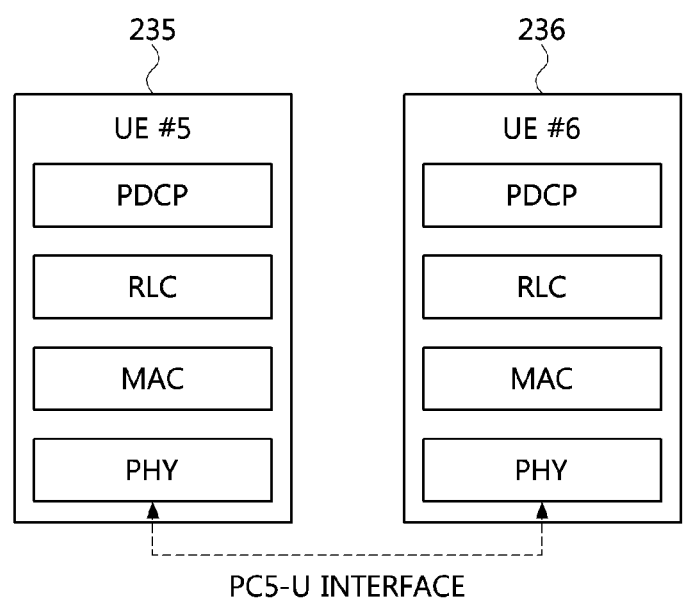
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
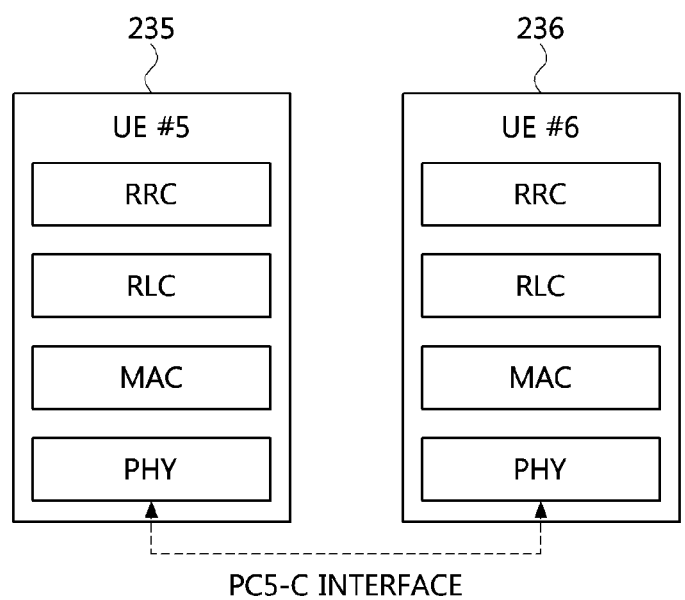
FIG. 5 is a block diagram illustrating a first exemplary embodiment of a control plane protocol stack of a UE performing sidelink communication.
Figure 6:
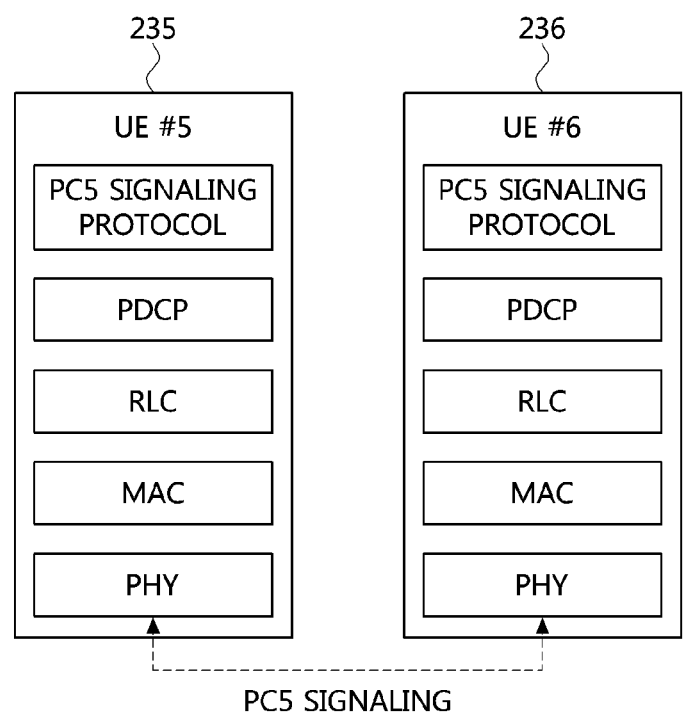
FIG. 6 is a block diagram illustrating a second exemplary embodiment of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, methods for transmitting and receiving HARQ responses for sidelink communication will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'.

The 1st-stage SCI may include or more information elements among priority information, frequency resource assignment information, time resource assignment information, resource reservation period information, demodulation reference signal (DMRS) pattern information, 2nd-stage SCI format information, a beta offset indicator, the number of DMRS ports, and modulation and coding scheme (MCS) information. The 2nd-stage SCI may include one or more information elements among a HARQ processor identifier (ID), a redundancy version (RV), a source ID, a destination ID, CSI request information, a zone ID, and communication range requirements.

Meanwhile, sidelink communication may be performed in a groupcast scheme. The sidelink communication performed in the groupcast scheme may be referred to as 'groupcast-sidelink communication'. Terminals participating in the groupcast-sidelink communication may transmit HARQ responses (e.g., ACK or NACK) by using a separate PSFCH (e.g., HARQ feedback resource). A PSFCH for ACK transmission may be shared by the terminal(s), and a PSFCH for NACK transmission may be shared by the terminal(s). The PSFCH for ACK transmission may be different from the PSFCH for NACK transmission.

In order to identify a HARQ feedback resource of each of the terminals participating in the groupcast-sidelink communication, an identifier (e.g., HARQ identifier) indicating the HARQ feedback resource may be used. The identifier indicating the HARQ feedback resource may be configured by a base station and/or a terminal (e.g., a terminal controlling the groupcast-sidelink communication or a terminal transmitting data in the groupcast-sidelink communication).

The terminals participating in the groupcast-sidelink communication may be configured as one group (e.g., groupcast group). Among the terminals belonging to the groupcast group, the terminal controlling the groupcast-sidelink communication or the terminal transmitting data in the groupcast-sidelink communication may be referred to as 'header terminal'. Among the terminals belonging to the groupcast group, terminal(s) other than the header terminal may be referred to as 'member terminal(s)'.

Figure 7:
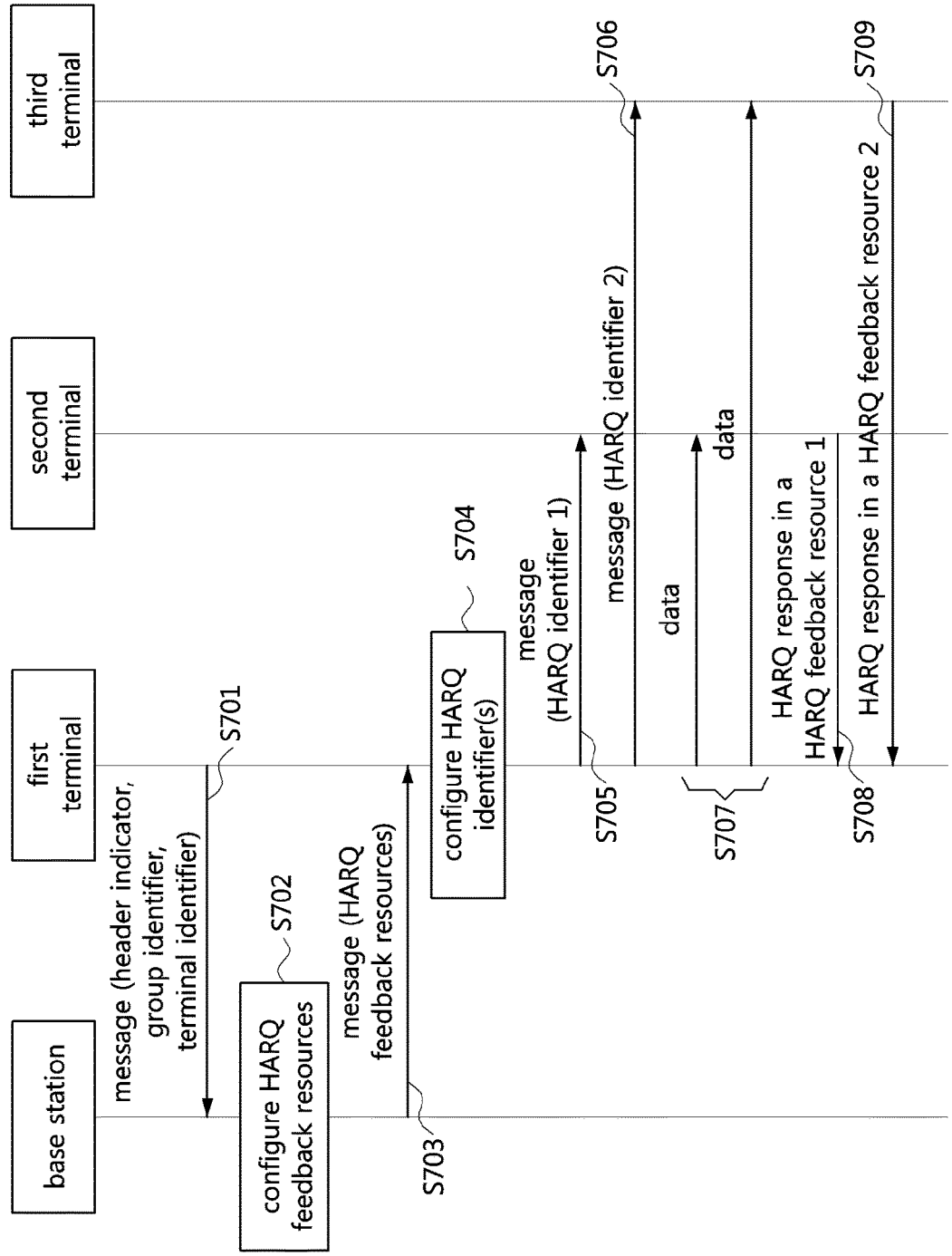
FIG. 7 is a sequence chart illustrating a first exemplary embodiment of a groupcast-sidelink communication method in a communication system.

FIG. 7 is a sequence chart illustrating a first exemplary embodiment of a groupcast-sidelink communication method in a communication system.

As shown in FIG. 7, a communication system may include a base station, a first terminal, a second terminal, and a third terminal. The base station may be the base station 210 shown in FIG. 2, and each of the first terminal, the second terminal, and the third terminal may be the UE 235 or the UE 236 shown in FIG. 2. Each of the base station, the first terminal, the second terminal, and the third terminal may be configured identically or similarly to the communication node 300 shown in FIG. 3. Each of the first terminal, the second terminal, and the third terminal may support the protocol stacks shown in FIGS. 4 to 6. The first terminal, the second terminal, and the third terminal may perform groupcast-sidelink communication and may belong to the same groupcast group. The first terminal may be a header terminal, and the second terminal and the third terminal may be member terminals.

The first terminal may determine that it operates as the header terminal of the groupcast group. In this case, the first terminal may transmit, to the base station, a message (e.g., RRC message) including an indicator (hereinafter, referred to as 'header indicator') indicating that the first terminal operates as the header terminal of the groupcast group, an identifier of the groupcast group (hereinafter referred to as 'group identifier'), and/or an identifier of the first terminal (hereinafter, referred to as 'terminal identifier') (S701). The terminal identifier may be an L2 identifier of the first terminal. The group identifier and/or the terminal identifier may be configured by the first terminal. For example, the group identifier and/or the terminal identifier may be generated by a V2X layer of the first terminal (i.e., header terminal) based on an identifier corresponding to a service. The V2X layer of the first terminal may deliver the group identifier and/or the terminal identifier to an RRC layer of the first terminal.

In addition, the message transmitted in the step S701 may further include an information element indicating the number of terminals belonging to the groupcast group (e.g., the number of member terminals) and/or the maximum number of terminals belonging to the groupcast group (e.g., the maximum number of member terminals).

The transmission of the header indicator by the first terminal may be for the base station to allocate HARQ feedback resource(s) to be used in the groupcast group to the first terminal indicated by the header indicator. The transmission of the group identifier by the first terminal may be for the base station to identify the groupcast group which will use the HARQ feedback resource(s). The transmission of the terminal identifier by the first terminal may be for the base station to identify a changed header terminal when the header terminal of the groupcast group is changed, and to re-allocate HARQ feedback resource(s) to the changed header terminal.

The message transmitted in the step S701 may be a sidelink UE information message, a UE assistance information message, or a new message. For example, when the message transmitted in the step S701 is a sidelink UE information message, the sidelink UE information message may include information element(s) defined in Table 3 below. In Table 3, GroupcastHeaderIndication may be the header indicator, GroupcastGroup-Identity may be the group identifier, and GroupcastHeader-Identity may be the terminal identifier (e.g., terminal identifier indicating the header terminal). In addition, in Table 3, NrofUEInGroupcastGroup may indicate the number of terminals belonging to the groupcast group (e.g., the number of member terminals), and maxNrofUEIGroupcastGroup may indicate the maximum number of terminals belonging to the groupcast group (e.g., the maximum number of member terminals).

TABLE 3

```
SidelinkUEInformation-v1430-IEs ::= SEQUENCE {
    v2x-CommRxInterestedFreqList-r14    SL-V2X-CommFreqList-r14
    OPTIONAL,
    p2x-CommTxType-r14                  ENUMERATED {true}
    OPTIONAL,
    v2x-CommTxResourceReq-r14           SL-V2X-CommTxFreqList-r14
    OPTIONAL,
    nonCriticalExtension                SidelinkUEInformation-v16-IEs
    OPTIONAL
}
SidelinkUEInformation-v16-IEs ::=   SEQUENCE {
    GroupcastHeaderIndication           ENUMERATED {true}
    OPTIONAL,
    GroupcastGroup-Identity-r16         GroupcastGroup L2 ID
    OPTIONAL,
    GroupcastHeader-Identity-r16        GroupcastHeader L2 ID
    OPTIONAL,
    NrofUEInGroupcastGroup                     INTEGER
    OPTIONAL,
    maxNrofUEInGroupcastGroup                  INTEGER
    OPTIONAL,
    nonCriticalExtension                SEQUENCE { }
    OPTIONAL
}
```

The base station may receive the message from the first terminal, and may identify the information elements included in the message (e.g., header indicator, group identifier, terminal identifier, and/or the number (e.g., maximum number) of terminals belonging to the groupcast group). For example, when the message is received in the step S701, the base station may confirm that groupcast-sidelink communication is to be performed, may confirm that the first terminal is the header terminal of the groupcast group, and may confirm the group identifier of the groupcast group controlled by the first terminal. In addition, the base station may identify the number of terminals belonging to the group cast group (e.g., the number of member terminals) and/or the maximum number of terminals (e.g., the maximum number of member terminals) belonging to the group cast group.

The base station may configure HARQ feedback resources (e.g., PSFCHs) for the groupcast-sidelink communication (S702). The step S702 may be performed when the message is received in the step S701. Alternatively, the step S702 may be performed independently of the step S701. The HARQ feedback resources may be independently configured for the terminals belonging to the groupcast group, respectively. Alternatively, the HARQ feedback resources configured by the base station may include HARQ feedback resource(s) for ACK transmission in the groupcast-sidelink communication and HARQ feedback resource(s) for NACK transmission in the groupcast-sidelink communication. Here, the HARQ feedback resource(s) for ACK transmission may be configured independently of the HARQ feedback resource(s) for NACK transmission.

In the step S702, the base station may configure the HARQ feedback resources based on a code division multiplexing (CDM) scheme, a frequency division multiplexing (FDM) scheme, and/or a time division multiplexing (TDM)

scheme. The HARQ feedback resources configured based on the CDM scheme (hereinafter, referred to as 'CDM resources') may include code sequences and/or a set of code sequences. The HARQ feedback resources configured based on the FDM scheme (hereinafter referred to as 'FDM resources') may include frequency resources and/or a set of frequency resources. A frequency resource (or a set of frequency resources) may be configured in units of subcarriers, physical resource blocks (PRBs), or resource block (RB) sets. The HARQ feedback resources configured based on the TDM scheme (hereinafter, referred to as 'TDM resources') may include time resources and/or a set of time resources. A time resource (or a set of time resources) may be configured in units of symbols, mini-slots, slots, or subframes.

The base station may transmit a message including information elements indicating the HARQ feedback resources (S703). The message including information elements indicating the HARQ feedback resources may be transmitted to the header terminal (e.g., the first terminal) or all terminals belonging to the groupcast group (e.g., the header terminal and member terminals). The message transmitted in the step S703 may be an RRC message. When the message transmitted in the step S703 is an RRC connection reconfiguration message, the RRC connection reconfiguration message may include information element(s) described in Table 4 below. In Table 4, CDMResourcesOfGroupcast may indicate HARQ feedback resources configured based on the CDM scheme in the groupcast-sidelink communication, FDMResourcesOfGroupcast may indicate HARQ feedback resources configured based on the FDM scheme in the groupcast-sidelink communication, and TDMResourcesOfGroupcast may indicate HARQ feedback resources configured based on the TDM scheme in the groupcast-sidelink communication.

TABLE 4

```
RRCConnectionReconfiguration-v16-IEs ::= SEQUENCE {
    CDMResourcesOfGroupcast          OPTIONAL,
    FDMResourcesOfGroupcast          OPTIONAL,
    TDMResourcesOfGroupcast          OPTIONAL
}
```

In another exemplary embodiment, when HARQ feedback resources are independently configured for each terminal belonging to the groupcast group, the message transmitted in the step S703 may include information element(s) described in Table 5 below. In Table 5, UEIdInGroupcastGroup may be an identifier of a terminal belonging to the groupcast group (e.g., an identifier of a member terminal). CDMResourcesOfGroupcast may indicate CDM resources configured for a terminal indicated by UEIdInGroupcastGroup. FDMResourcesOfGroupcast may indicate FDM resources configured for the terminal indicated by UEIdInGroupcastGroup. TDMResourcesOfGroupcast may indicate TDM resources configured for the terminal indicated by UEIdInGroupcastGroup.

TABLE 5

```
RRCConnectionReconfiguration-v16-IEs ::= SEQUENCE {
    UEIdInGroupcastGroup
        CDMResourcesOfGroupcast      OPTIONAL,
        FDMResourcesOfGroupcast      OPTIONAL,
        TDMResourcesOfGroupcast      OPTIONAL
}
```

In another exemplary embodiment, HARQ feedback resources for ACK transmission may be configured independently of HARQ feedback resources for NACK transmission. In this case, the message transmitted in the step S703 may include information element(s) described in Table 6 below. In Table 6, ACKResources may indicate HARQ feedback resources for ACK transmission, and NACKResources may indicate HARQ feedback resources for NACK transmission.

TABLE 6

```
RRCConnectionReconfiguration-v16-IEs ::= SEQUENCE {
    ACKResources
        CDMresourcesOfgroupcast      OPTIONAL,
        FDMresourcesOfgroupcast      OPTIONAL,
        TDMresourcesOfgroupcast      OPTIONAL,
    NACKResources
        CDMresourcesOfgroupcast      OPTIONAL,
        FDMresourcesOfgroupcast      OPTIONAL,
        TDMresourcesOfgroupcast      OPTIONAL
}
```

In another exemplary embodiment, a HARQ identifier indicating HARQ feedback resource(s) may be configured, and the message transmitted in the step S703 may include information on the HARQ feedback resource(s) indicated by the HARQ identifier. In this case, the message transmitted in the step S703 may include information element(s) defined in Table 7 below. In Table 7, groupcastHARQIdentity may be a HARQ identifier. CDMResourcesOfGroupcast may indicate CDM resources mapped to the HARQ identifier indicated by groupcastHARQIdentity. FDMResourcesOfGroupcast may indicate FDM resources mapped to the HARQ identifier indicated by groupcastHARQIdentity. TDMResourcesOfGroupcast may indicate TDM resources mapped to the HARQ identifier indicated by groupcastHARQIdentity.

TABLE 7

```
RRCConnectionReconfiguration-v16-IEs ::= SEQUENCE {
    groupcastHARQIdentity-r16        INTEGER (1..max
  groupcastHARQIdentity)
        CDMresourcesOfgroupcast      OPTIONAL,
        FDMresourcesOfgroupcast      OPTIONAL,
        TDMresourcesOfgroupcast      OPTIONAL
}
```

Meanwhile, the first terminal (e.g., header terminal) may receive the message including the information element(s) indicating HARQ feedback resources, and may identify the HARQ feedback resources indicated by the received message. When the message is transmitted to all terminals belonging to the groupcast group in the step S703, not only the header terminal (e.g., the first terminal) but also the member terminals (e.g., the second terminal and the third terminal) may identify the HARQ feedback resources configured by the base station. The HARQ feedback resources identified by the terminal(s) belonging to the groupcast group may be the HARQ feedback resources defined in Table 4, Table 5, Table 6, and/or Table 7.

The first terminal may determine a HARQ feedback resource to be allocated to each of the member terminals (e.g., the second terminal and the third terminal) among the HARQ feedback resources (e.g., the HARQ feedback resources listed in Table 4) configured by the base station, and configure a HARQ identifier used to identify the determined HARQ feedback resource (S704). The HARQ identifiers may be sequentially configured. For example, when the HARQ feedback resources are CDM resources and the number of code sequences constituting the CDM resources is N, the HARQ identifiers may be defined as shown in Table 8 below. One HARQ identifier may be mapped to one code sequence. Here, N may be a natural number.

TABLE 8

| HARQ identifier | CDM resource (code sequence) |
|---|---|
| 1 | 1 |
| 2 | 2 |
| 3 | 3 |
| ... | ... |
| N | N |

As another exemplary embodiment, when the HARQ feedback resources are FDM resources and the number of frequency resources constituting the FDM resources is N, the HARQ identifiers may be defined as shown in Table 9 below. One HARQ identifier may be mapped to one frequency resource. One frequency resource may be composed of one or more subcarriers, one or more PRBs, or one or more RB sets. Here, N may be a natural number.

TABLE 9

| HARQ identifier | FDM resource (frequency resource) |
|---|---|
| 1 | 1 |
| 2 | 2 |
| 3 | 3 |
| ... | ... |
| N | N |

As another exemplary embodiment, when the HARQ feedback resources are TDM resources and the number of time resources constituting the TDM resources is N, the HARQ identifiers may be defined as shown in Table 10 below. One HARQ identifier may be mapped to one time resource. One time resource may consist of one or more symbols, one or more mini-slots, one or more slots, or one or more subframes. Here, N may be a natural number.

TABLE 10

| HARQ identifier | TDM resource (time resource) |
|---|---|
| 1 | 1 |
| 2 | 2 |
| 3 | 3 |
| ... | ... |
| N | N |

Meanwhile, the first terminal may assign a HARQ identifier (e.g., HARQ identifier defined in Table 8, Table 9, or Table 10) to a member terminal. The HARQ identifiers may be sequentially assigned to member terminals. For example, the first terminal may assign a HARQ identifier 1 to the second terminal and may assign a HARQ identifier 2 to the third terminal. The first terminal may transmit a message including the HARQ identifier 1 to the second terminal (S705). The message transmitted in the step S705 may further include an information element indicating a CDM resource 1, FDM resource 1, and/or TDM resource 1 mapped to the HARQ identifier 1. The first terminal may transmit a message including the HARQ identifier 2 to the third terminal (S706). The message transmitted in the step S706 may further include an information element indicating a CDM resource 2, FDM resource 2, and/or TDM resource 2 mapped to the HARQ identifier 2.

The HARQ identifiers assigned to the member terminals may be used to distinguish HARQ feedback resources between the member terminals. The message transmitted in the steps S705 and S706 may be one or a combination of two or more of an RRC message, a MAC message, and a PHY message. When the message transmitted in the steps S705 and S706 is an RRC message, the RRC message may include information element(s) described in Table 11 below. Here, the RRC message may be a GroupcastConfigInformation message. In Table 11, groupcastHARQIdentity may be a HARQ identifier. The groupcast configuration information message may further include an information element indicating a HARQ feedback resource mapped to the HARQ identifier indicated by groupcastHARQIdentity.

TABLE 11

GroupcastConfigInformation-r16-IEs ::= SEQUENCE {
  groupcastHARQIdentity-r16        GroupcastHARQIdentity-r16
    OPTIONAL,
  nonCriticalExtension            SEQUENCE { }
}

In Table 11, groupcastHARQIdentity may be defined as shown in Table 12 below.

TABLE 12

GroupcastHARQIdentity-r16 ::=    INTEGER (0.. xxxxxx)

When the total number of member terminals belonging to the groupcast group is less than or equal to the total number of HARQ feedback resources (e.g., HARQ feedback resources constituting one PSFCH) configured by the base station, the above-described HARQ identifier assignment method may be applied. When the total number of member terminals belonging to the groupcast group exceeds the total number of HARQ feedback resources configured by the base station, the header terminal (e.g., the first terminal) may use additional PSFCH(s) to apply the above-described HARQ identifier assignment method.

On the other hand, when HARQ feedback resources are configured by the message including the information element(s) defined in Table 5, and the message is transmitted to all terminals belonging to a groupcast group, a header terminal and member terminals may identify the HARQ feedback resource allocated to each of the terminals. In this case, the steps S704, S705, and S706 may be omitted. When HARQ feedback resources are configured by the message including the information element(s) defined in Table 5, and the message is transmitted to a header terminal belonging to a groupcast group, the header terminal may allocate a HARQ feedback resource mapped to a terminal identifier (e.g., UEIdInGroupcastGroup) to a member terminal indicated by the corresponding terminal identifier. In this case, the step S704 may be omitted, the message transmitted in the step S705 may include an information element indicating the HARQ feedback resource allocated to the first terminal, and the message transmitted in the step S706 may include an information element indicating the HARQ feedback resource allocated to the second terminal.

On the other hand, when HARQ feedback resources are configured by the message including the information element(s) defined in Table 6, and the message is transmitted to all terminals belonging to a groupcast group, a header terminal and member terminals may identify HARQ feedback resource(s) for ACK transmission and HARQ feedback resource(s) for NACK transmission. In this case, the steps S704, S705, and S706 may be omitted. When HARQ feedback resources are configured by the message including the information element(s) defined in Table 6, and the message is transmitted to a header terminal belonging to a groupcast group, the header terminal may transmit, to member terminals, a message including information element(s) indicating the HARQ feedback resource(s) for ACK transmission and/or information element(s) indicating the HARQ feedback resource(s) for NACK transmission. The HARQ feedback resource(s) for ACK transmission and the HARQ feedback resource(s) for NACK transmission may be shared by the member terminals.

On the other hand, when HARQ feedback resources are configured by the message including the information element(s) defined in Table 7, and the message is transmitted to all terminals belonging to a groupcast group, a header terminal may assign a HARQ identifier (e.g., groupcast-HARQIdentity) to each member terminal (S704), and transmit a message including the assigned HARQ identifier to the corresponding member terminal (S705 and S706). For example, the first terminal (e.g., header terminal) may transmit a message including a HARQ identifier 1 to the second terminal (e.g., member terminal), and transmit a message including a HARQ identifier 2 to the third terminal (e.g., member terminal). When HARQ feedback resources are configured by the message including the information element(s) defined in Table 7, and the message is transmitted to a header terminal belonging to a groupcast group, the header terminal may assign (e.g., groupcastHARQIdentity) a HARQ identifier to each member terminal (S704), and transmit a message including the assigned HARQ identifier to the corresponding member terminal (S705 and S706). Here, the message may further include an information element indicating a HARQ feedback resource mapped to the HARQ identifier.

When the assignment (or configuration) of the HARQ identifier and/or the HARQ feedback resource is completed, groupcast-sidelink communication may be performed. The first terminal may transmit data (e.g., sidelink data) to the member terminals (e.g., the second terminal and the third terminal) in the groupcast scheme (S707). The second terminal may receive the data from the first terminal, and may transmit a HARQ response for the data to the first terminal by using the HARQ feedback resource (e.g., HARQ feedback resource 1 mapped to HARQ identifier 1) (S708). The third terminal may receive the data from the first terminal, and transmit a HARQ response for the data to the first terminal by using the HARQ feedback resource (e.g., HARQ feedback resource 2 mapped to HARQ identifier 2) (S709).

The first terminal may receive the HARQ response in the HARQ feedback resource 1, and may determine that the corresponding HARQ response is the HARQ response of the second terminal to which the HARQ feedback resource 1 is allocated. That is, the first terminal may identify whether the data has been successfully received at the second terminal based on the HARQ response received in the HARQ feedback resource 1. The first terminal may receive the HARQ response in the HARQ feedback resource 2, and may determine that the corresponding HARQ response is the HARQ response of the third terminal to which the HARQ feedback resource 2 is allocated. That is, the first terminal may identify whether the data has been successfully received at the third terminal based on the HARQ response received in the HARQ feedback resource 2. The first terminal may perform a retransmission procedure based on the HARQ response.

Meanwhile, when new terminal(s) are added to a groupcast group or when an existing terminal leaves a groupcast group, the groupcast group may be updated. In a groupcast group update procedure, a header terminal (e.g., the first terminal) may sequentially allocate HARQ feedback resources (e.g., HARQ identifiers mapped to the HARQ feedback resources) to new member terminals. The HARQ feedback resource may be a CDM resource, an FDM resource, and/or a TDM resource.

For example, in a case defined in Table 13 below, the first terminal (e.g., header terminal) may allocate a HARQ feedback resource 4 among HARQ feedback resources configured by the base station to a terminal 5, which is a new member terminal. In this case, a HARQ identifier 4 mapped to the HARQ feedback resource 4 may be transmitted from the first terminal to the fifth terminal. That is, the HARQ feedback resources and/or the HARQ identifiers may be sequentially allocated to new member terminals. The HARQ identifier 4 and/or an information element indicating the HARQ feedback resource 4 mapped to the HARQ identifier 4 may be signaled through one or a combination of two or more of an RRC message (e.g., groupcast configuration information message), a MAC message, and a PHY message. The HARQ feedback resource 4 identified by the HARQ identifier 4 may be a code sequence 4, a frequency resource 4, and/or a time resource 4. The HARQ identifiers may be used to distinguish HARQ feedback resources between member terminals.

TABLE 13

| | |
|---|---|
| Existing header terminal | First terminal |
| Existing member terminals | Second, third, and fourth terminals |
| New member terminal | Fifth terminal |
| HARQ feedback resources configured by the base station | HARQ feedback resources 1, 2, 3, . . . , N (N is a natural number of 4 or more) |
| HARQ identifiers and HARQ feedback resources allocated to the existing member terminals | |
| Second terminal | HARQ identifier 1 → HARQ feedback resource 1 |
| Third terminal | HARQ identifier 2 → HARQ feedback resource 2 |
| Fourth terminal | HARQ identifier 3 → HARQ feedback resource 3 |

As another exemplary embodiment, in a case defined in Table 14 below (e.g., a case in which the third terminal leaves the groupcast group), the first terminal (e.g., header terminal) may allocate the HARQ feedback resource 4 among the HARQ feedback resources configured by the base station to the fifth terminal, which is a new member terminal. That is, even when the HARQ feedback resource 2 is not allocated, the first terminal may allocate the HARQ feedback resource 4 to the fifth terminal, which is a new member terminal, according to the sequential allocation scheme. In this case, the HARQ identifier 4 mapped to the HARQ feedback resource 4 may be transmitted from the first terminal to the fifth terminal. Here, the first terminal may assign a HARQ identifier irrespective of the existence of the member terminal (e.g., whether the member terminal leaves) corresponding to the previously-assigned HARQ identifier (e.g., the HARQ feedback resource mapped to the HARQ identifier). The HARQ identifier 4 and/or an information element indicating the HARQ feedback resource 4 mapped to the HARQ identifier 4 may be signaled through one or a combination of two or more of an RRC message (e.g., groupcast configuration information message), a MAC message, and a PHY message.

When the number N of HARQ feedback resources configured by the base station in the above-described case (e.g., the case in which the third terminal leaves the groupcast group) is 6, the HARQ feedback resource 2 may not be allocated to another member terminal until all of the HARQ feedback resources 4 to 6 (e.g., the remaining HARQ feedback resources) are allocated.

TABLE 14

| | |
|---|---|
| Existing header terminal | First terminal |
| Existing member terminals | Second and fourth terminals |
| New member terminal | Fifth terminal |
| HARQ feedback resources configured by the base station | HARQ feedback resources 1, 2, 3, . . . , N (N is a natural number of 4 or more) |
| HARQ identifiers and HARQ feedback resources allocated to the existing member terminals | |
| Second terminal | HARQ identifier 1 → HARQ feedback resource 1 |
| Fourth terminal | HARQ identifier 3 → HARQ feedback resource 3 |

Alternatively, in the case defined in Table 14 (e.g., the case in which the third terminal leaves the groupcast group), the first terminal (e.g., header terminal) may identify the presence of the member terminal (e.g., whether the member terminal leaves the groupcast group) corresponding to the previously-assigned HARQ identifier (e.g., the HARQ feedback resource mapped to the HARQ identifier), and if the third terminal corresponding to the HARQ identifier 2 does not exist, the first terminal may assign the HARQ identifier 2 (e.g., the HARQ feedback resource 2 mapped to the HARQ identifier 2) to the terminal 5, which is a new member terminal. In this case, the first terminal may transmit a message including the HARQ identifier 2 and/or an information element indicating the HARQ feedback resource 2 mapped to the HARQ identifier 2 to the fifth terminal. Here, the message may be one or a combination of two or more of an RRC message (e.g., groupcast configuration information message), a MAC message, and a PHY message. The HARQ feedback resource 2 identified by the HARQ identifier 2 may be a code sequence 2, a frequency resource 2, and/or a time resource 2. The HARQ identifiers may be used to distinguish HARQ feedback resources between member terminals.

Alternatively, in the case defined in Table 14 (e.g., the case in which the third terminal leaves the group cast group), the first terminal (e.g., header terminal) may reconfigure the HARQ identifiers of the existing member terminals (e.g., HARQ feedback resources mapped to the HARQ identifiers). In this case, the HARQ identifier assigned to the second terminal may be maintained as the HARQ identifier 1, and the HARQ identifier assigned to the fourth terminal may be reconfigured from the HARQ identifier 3 to the HARQ identifier 2. In addition, the HARQ feedback resource allocated to the fourth terminal may be reconfigured to the HARQ feedback resource 2 mapped to the HARQ identifier 2. A message including the reassigned HARQ identifier and/or an information element indicating a HARQ feedback resource mapped to the reassigned HARQ identifier may be transmitted to the corresponding member terminal (e.g., fourth terminal). Thereafter, the first terminal may assign the HARQ identifier 3 (e.g., the HARQ feedback resource 3 mapped to the HARQ identifier 3) to the fifth terminal, which is a new member terminal.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

The invention claimed is:

1. A method of a first user equipment (UE), comprising:
configuring a first hybrid automatic repeat request (HARQ) identifier mapped to a first HARQ feedback resource;
transmitting a message including the first HARQ identifier to a second UE;
transmitting sidelink data to a plurality of UEs belonging to a groupcast group in a groupcast scheme;
receiving a HARQ response for the sidelink data from the second UE in the first HARQ feedback resource mapped to the first HARQ identifier;
reconfiguring HARQ identifiers allocated to remaining UEs excluding the second UE among the plurality of UEs when the second UE leaves the groupcast group; and
transmitting the reconfigured HARQ identifiers to the remaining UEs,
wherein the second UE belongs to the groupcast group.

2. The method according to claim 1, wherein a plurality of HARQ feedback resources for the groupcast group are configured to the plurality of UEs, and the first HARQ feedback resource mapped to the first HARQ identifier belongs to the plurality of HARQ feedback resources.

3. The method according to claim 2, wherein the plurality of HARQ feedback resources are independently configured for the plurality of UEs belonging to the groupcast group.

4. The method according to claim 1, further comprising:
transmitting, to a base station, a message including one or more of a UE identifier of the first UE, a header indicator indicating that the first UE operates as a header UE of the groupcast group, or a group identifier indicating the groupcast group controlled by the first UE; and
receiving, from the base station, a message including information elements indicating a plurality of HARQ feedback resources for the groupcast group,
wherein the first HARQ feedback resource mapped to the first HARQ identifier belongs to the plurality of HARQ feedback resources.

5. The method according to claim 1, wherein the message is a radio resource control (RRC) message, a medium access control (MAC) message, or a physical (PHY) message.

6. The method according to claim 1, wherein the first HARQ feedback resource is a code sequence configured by a code division multiplexing (CDM) scheme, a frequency resource configured by a frequency division multiplexing (FDM) scheme, or a time resource configured by a time division multiplexing (TDM) scheme.

7. The method according to claim 1, further comprising:
configuring a second HARQ identifier mapped to a second HARQ feedback resource when a new UE is added to the groupcast group; and
transmitting a message including the second HARQ identifier to the new UE.

8. A method of a second user equipment (UE), comprising:
receiving, from a first UE, a message including a first hybrid automatic repeat request (HARQ) identifier mapped to a first HARQ feedback resource;
receiving sidelink data from the first UE;
generating a HARQ response for the sidelink data; and
transmitting the HARQ response to the first UE in the first HARQ feedback resource mapped to the first HARQ identifier;
when the third UE leaves the groupcast group, receiving a message including a reconfigured HARQ identifier from the first UE,
wherein in a HARQ feedback procedure, the reconfigured HARQ identifier is used instead of the first HARQ identifier, and
wherein the sidelink data is transmitted by the first UE in a groupcast scheme.

9. The method according to claim 8, further comprising receiving, from a base station, a message including information elements indicating a plurality of HARQ feedback resources for a groupcast group to which the second UE belongs, wherein the first HARQ feedback resource belongs to the plurality of HARQ feedback resources.

10. The method according to claim 8, wherein the message further includes an information element indicating the first HARQ feedback resource.

11. The method according to claim 8, wherein the message is a radio resource control (RRC) message, a medium access control (MAC) message, or a PHY (physical) message.

12. The method according to claim 8, wherein the first HARQ feedback resource is a code sequence configured by a code division multiplexing (CDM) scheme, a frequency resource configured by a frequency division multiplexing (FDM) scheme, or a time resource configured by a time division multiplexing (TDM) scheme.

13. A first user equipment (UE), comprising:
a processor; and
a memory storing at least one instruction executable by the processor,
wherein the at least one instruction causes the first UE to:
configure a first hybrid automatic repeat request (HARQ) identifier mapped to a first HARQ feedback resource;
transmit a message including the first HARQ identifier to a second UE;
transmit sidelink data to a plurality of UEs belonging to a groupcast group in a groupcast scheme;
receive a HARQ response for the sidelink data from the second UE in the first HARQ feedback resource mapped to the first HARQ identifier; and
reconfigure HARQ identifiers allocated to remaining UEs excluding the second UE among the plurality of UEs when the second UE leaves the groupcast group; and
transmit the reconfigured HARQ identifiers to the remaining UEs,
wherein the second UE belongs to the groupcast group.

14. The first UE according to claim 13, wherein a plurality of HARQ feedback resources for the groupcast group are configured to the plurality of UEs, the first HARQ feedback resource mapped to the first HARQ identifier belongs to the plurality of HARQ feedback resources, and the plurality of HARQ feedback resources are independently configured for the plurality of UEs belonging to the groupcast group.

15. The first UE according to claim 13, wherein the at least one instruction further causes the first UE to:
transmit, to a base station, a message including one or more of a UE identifier of the first UE, a header indicator indicating that the first UE operates as a header UE of the groupcast group, or a group identifier indicating the groupcast group controlled by the first UE; and
receive, from the base station, a message including information elements indicating a plurality of HARQ feedback resources for the groupcast group,
wherein the first HARQ feedback resource mapped to the first HARQ identifier belongs to the plurality of HARQ feedback resources.

16. The first UE according to claim 13, wherein the first HARQ feedback resource is a code sequence configured by a code division multiplexing (CDM) scheme, a frequency resource configured by a frequency division multiplexing (FDM) scheme, or a time resource configured by a time division multiplexing (TDM) scheme.

17. The first UE according to claim 13, wherein the at least one instruction further causes the first UE to:
configure a second HARQ identifier mapped to a second HARQ feedback resource when a new UE is added to the groupcast group; and
transmit a message including the second HARQ identifier to the new UE.

* * * * *